(12) United States Patent
Sistla et al.

(10) Patent No.: US 7,644,293 B2
(45) Date of Patent: Jan. 5, 2010

(54) METHOD AND APPARATUS FOR DYNAMICALLY CONTROLLING POWER MANAGEMENT IN A DISTRIBUTED SYSTEM

(75) Inventors: Krishnakanth Sistla, Hillsboro, OR (US); Steven R. Hutsell, Banks, OR (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 11/479,438

(22) Filed: Jun. 29, 2006

(65) Prior Publication Data

US 2008/0005596 A1 Jan. 3, 2008

(51) Int. Cl.
*G06F 1/32* (2006.01)
(52) U.S. Cl. .................. 713/323; 713/321; 713/324; 711/170; 365/227; 718/104
(58) Field of Classification Search .......... 713/323, 713/324, 321; 718/104; 365/227; 711/170
See application file for complete search history.

(56) References Cited

U.S. PATENT DOCUMENTS

| | | | |
|---|---|---|---|
| 5,432,918 | A | 7/1995 | Stamm |
| 5,809,536 | A | 9/1998 | Young et al. |
| 5,870,616 | A | 2/1999 | Loper et al. |
| 5,875,472 | A | 2/1999 | Bauman et al. |
| 6,009,488 | A | 12/1999 | Kavipurapu |
| 6,038,673 | A | 3/2000 | Benn et al. |
| 6,327,606 | B1 * | 12/2001 | Chidambaran ............ 718/104 |
| 6,804,761 | B1 * | 10/2004 | Chen et al. ............... 711/170 |
| 7,007,176 | B2 | 2/2006 | Goodfellow et al. |
| 7,043,650 | B2 | 5/2006 | Bresniker et al. |
| 2005/0262505 | A1 * | 11/2005 | Esfahany et al. .......... 718/1 |
| 2007/0079072 | A1 | 4/2007 | Collier et al. |
| 2007/0233932 | A1 | 10/2007 | Collier et al. |
| 2008/0126707 | A1 | 5/2008 | Sistla |
| 2008/0126750 | A1 | 5/2008 | Sistla |

OTHER PUBLICATIONS

PCT Internal Search Report and Written Opinion, International application No. PCT/US2007/072294 mailed Oct. 30, 2007.
U.S. Appl. No. 11/479,009 entitled, "Method and Apparatus to Dynamically Adjust Resource Power Usage in a Distributed System" Hutsell et al., filed Jun. 29, 2006.
United States Office Action dated Apr. 2, 2009, for U.S Appl. No. 11/605,636, filed Nov. 29, 2006, entitled "System and Method for Aggregating Core-Cache Clusters in Order to Produce Multi-Core Processors".
United States Office Action dated Jan. 27, 2009, for U.S. Appl. No. 11/606,347, filed Nov. 29, 2006, entitled "Scalability Agent: A Scalable Method for Aggregating Core-Cache Domains for Building Multicore CMP-Utility".
United States Office Action dated Jul. 27, 2009 for U.S. Appl. No. 11/606,347, filed Nov. 29, 2006.

* cited by examiner

*Primary Examiner*—Thuan N Du
(74) *Attorney, Agent, or Firm*—Blakely, Sokoloff, Taylor & Zafman LLP (57) ABSTRACT

According to one embodiment of the invention, an activity detector comprises a resource partitioned into a plurality of chunks, a power controller and an activity detection unit. In communication with the activity detector and the resource, the power controller, based on measured activity by the activity detector, activates an additional chunk of the plurality of chunks and assigned the additional chunk to a specified agent or deactivates at least one chunk of the plurality of chunks.

19 Claims, 7 Drawing Sheets

METHOD AND APPARATUS FOR DYNAMICALLY CONTROLLING POWER MANAGEMENT IN A DISTRIBUTED SYSTEM

FIELD

Embodiments of the invention relate to the field of power management, and according to one embodiment, a method and apparatus for dynamically managing power for a Common System Interconnect (CSI) style distributed system.

GENERAL BACKGROUND

Microprocessors commonly use dynamic power management techniques to manage power usage. Normally, dynamic power management for microprocessors is accomplished through activity detection circuitry that is located in the microprocessor and coupled to a centralized, front side bus (FSB). The activity detection circuitry is adapted to detect conditions under which certain units should be turned on or off and to adjust the power levels of these units appropriately.

Traditionally, the activity detection circuitry has provided acceptable performance because such circuitry was physically separated from the power-controlled units by only a short distance. However, bus architectures are moving away from FSB architectures and are beginning to utilize point-to-point architectures. One type of point-to-point architecture is referred to as "Common System Interconnect" or "CSI". This architecture will likely experience difficulties in power management.

One reason for experiencing such difficulties is that CSI-style distributed systems support implementations where the power management circuitry and the power-controlled units are placed on different integrated circuits, but are connected by CSI links. As a result, conventional activity detection circuitry cannot effectively hide the latency to turn on/off the units from the performance aspects of the system since it cannot provide adequate lead time to circuitry of these units to turn power on or off.

BRIEF DESCRIPTION OF THE DRAWINGS

The invention may best be understood by referring to the following description and accompanying drawings that are used to illustrate embodiments of the invention.

DETAILED DESCRIPTION

Herein, certain embodiments of the invention relate to distributed power control within in a Common System Interconnect (CSI) based system. This distributed power control, referred to as "source controlled dynamic power management (SCDPM)," may be accomplished by implementing power management logic within a destination device that allows one or more source devices to dynamically manage the resources at the destination device through use of a messaging scheme.

More specifically, SCDPM may be accomplished by implementing power management logic in the home agent that allows one or more caching agents to dynamically vary the number of active tracker entries, buffers and the like based on system-level activity. This is especially useful for input/output (I/O) devices operating as caching agents which require a large number of buffers (due to longer latency) to cover the interconnect peak bandwidth, but rarely use this amount of buffering in practice. This dynamic adjustment of resources by the caching agents will substantially mitigate the amount of power wasted by a system because the number of tracker entries and buffers, which can burn significant amounts of clocking, active and leakage power, can be reduced from the maximum number required.

According to one embodiment of the invention, the SCDPM architecture is particularly useful in managing the power usage of a home agent but may be extensible to other devices as well. Hence, SCDPM can be considered a system-level power management architecture and may be deployed in other types of systems that those described below for illustrative purposes.

In the following description, certain terminology is used to describe features of the invention. For example, the term "device" or "agent" are general used to describe any electrical component coupled to a link. A "link" is generally defined as an information-carrying medium that establishes a communication pathway for messages, namely information placed in a predetermined format. The link may be a wired physical medium (e.g., a bus, one or more electrical wires, trace, cable, etc.) or a wireless medium (e.g., air in combination with wireless signaling technology).

The term "home agent" is broadly defined as a device that provides resources for a caching agent to access memory and, based on requests from the caching agents, can resolve conflicts, maintain ordering and the like. The home agent includes a tracker and data buffer(s) for each caching agent as described below. A "tracker" is dedicated storage for memory requests from a particular device. For instance, a first tracker may include a plurality of entries associated with a first caching agent while a second tracker may include other entries associated with a second caching agent. According to one embodiment of the invention, the "caching agent" is generally a cache controller that is adapted to route memory requests to the home agent.

The term "logic" is generally defined as hardware and/or software that perform one or more operations such as controlling the exchange of messages between devices. When deployed in software, such software may be executable code such as an application, a routine or even one or more instructions. Software may be stored in any type of memory, normally suitable storage medium such as (i) any type of disk including floppy disks, magneto-optical disks and optical disks such as compact disk read-only memories (CD-ROMs), compact disk rewritables (CD-RWs), digital versatile disks (DVDs), (ii) any type of semiconductor devices such as read-only memories (ROMs), random access memories (RAMs), erasable programmable read-only memories (EPROMs), flash memories, electrically erasable programmable read-only memories (EEPROMs), (iii) magnetic or optical cards, or (iv) any other type of media suitable for storing electronic instructions.

In the following description, numerous specific details are set forth. However, it is understood that embodiments of the invention may be practiced without these specific details. In other instances, well-known circuits, structures and techniques have not been shown in detail in order not to obscure the understanding of this description.

I. Exemplary System Architecture

Figure 1:
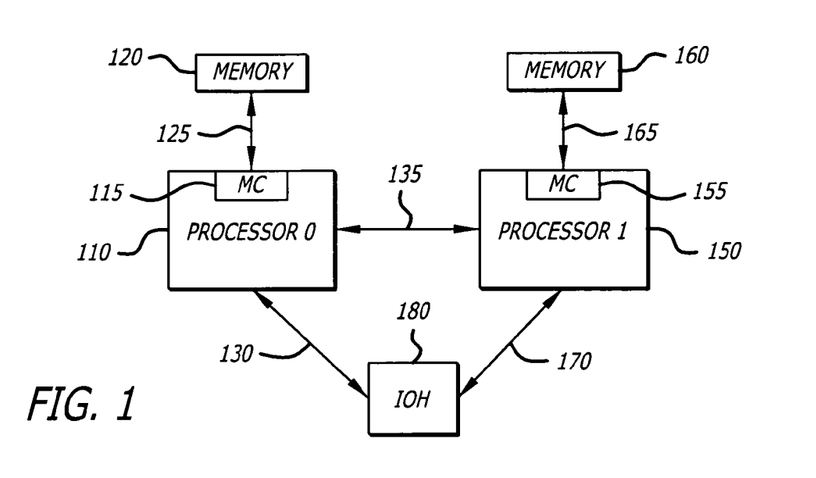
FIG. 1 is an exemplary block diagram of a dual processor system in accordance with an embodiment of the invention.

Referring to FIG. 1, an exemplary block diagram of a system in accordance with one embodiment of the invention is shown. Herein, system 100 is illustrated as a dual processor (DP) system 100 representing a variety of platforms. For instance, DP system 100 may be associated with a desktop or mobile computer, a server, a set-top box, personal digital assistant (PDA), alphanumeric pager, cellular telephone, or any other type of wired or wireless communication devices.

As shown, according to one embodiment of the invention, DP system 100 comprises a pair of processors such as a first processor 110 and a second processor 150 for example. Each processor 110 and 150 includes a memory controller (MC) 115 and 155 to enable direct communications with an associated memory 120 and 160 via links 125 and 165, respectively. Moreover, the memories 120 and 160 may be independent memories or portions of the same shared memory.

As specifically shown in FIG. 1, processors 110 and 150 are coupled to an input/output hub (IOH) 180 via point-to-point links 130 and 170, respectively. IOH 180 provides connectivity between processors 110 and 150 and input/output (I/O) devices implemented within DP system 100. In addition, processors 110 and 150 are coupled to each other via a point-to-point link 135. According to one embodiment of the invention, these point-to-point links 130, 135, 170 may be adapted to operate in accordance with "Common System Interconnect" specification developed by Intel Corporation of Santa Clara, Calif.

Figure 2:
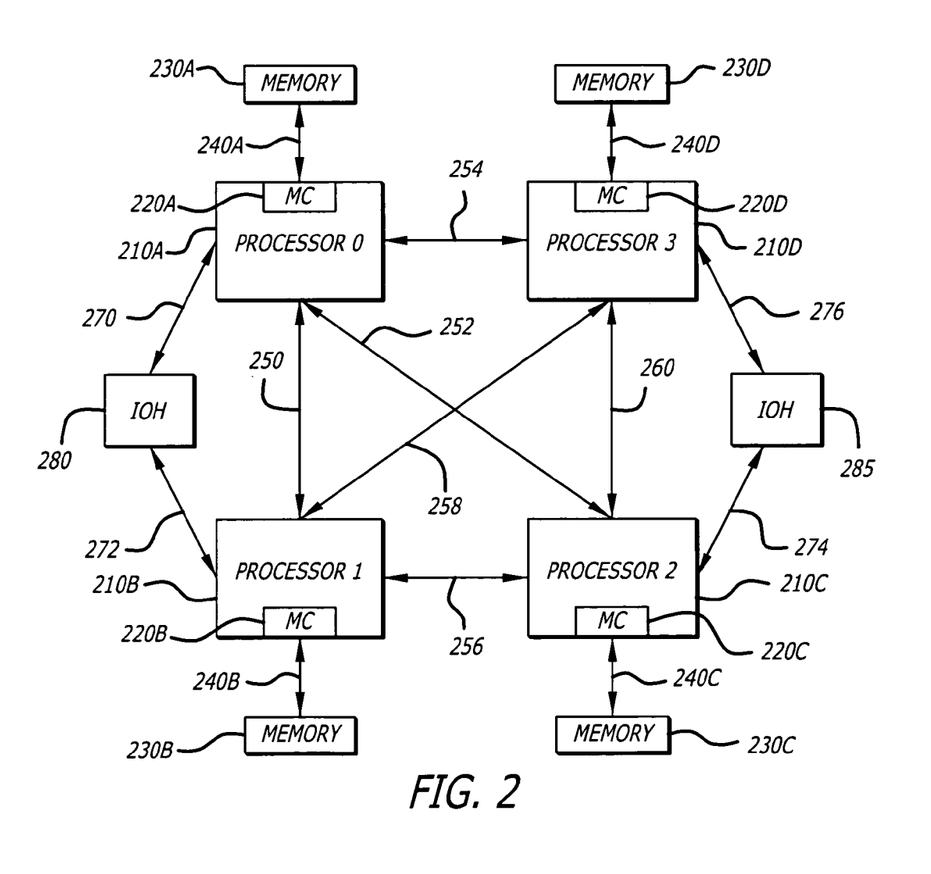
FIG. 2 is an exemplary block diagram of a multi-processor system in accordance with an embodiment of the invention.

Referring now to FIG. 2, an exemplary block diagram of a multiprocessor (MP) system 200 in accordance with one embodiment of the invention is shown. Similarly, MP system 200 may be a desktop or mobile computer, a server, a set-top box, personal digital assistant (PDA), alphanumeric pager, cellular telephone, or any other type of wired or wireless communication devices.

Herein, according to one embodiment of the invention, MP system 200 comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively.

Additionally, processor 210A is coupled to each of the other processors 210B-210D via point-to-point (e.g., CSI) links 250, 252 and 254. Similarly, processor 210B is coupled to processors 210A, 210C and 210D via CSI links 250, 256 and 258. Processor 210C is coupled to processors 210A, 210B and 210D via CSI links 252, 256 and 260. Processor 210D is coupled to processors 210A, 210B and 210C via CSI links 254, 258 and 260. Processors 210A and 210B are coupled via point-to-point interconnects 270 and 272 to a first input/output hub (IOH) 280 while processors 210C and 210D are coupled via point-to-point interconnects 274 and 276 to a second IOH 285.

For both systems 100 and 200 described in FIGS. 1 and 2, it is contemplated that the processors may be adapted to operate as a home agent, a caching agent or both, depending on the system architecture selected.

Figure 3:
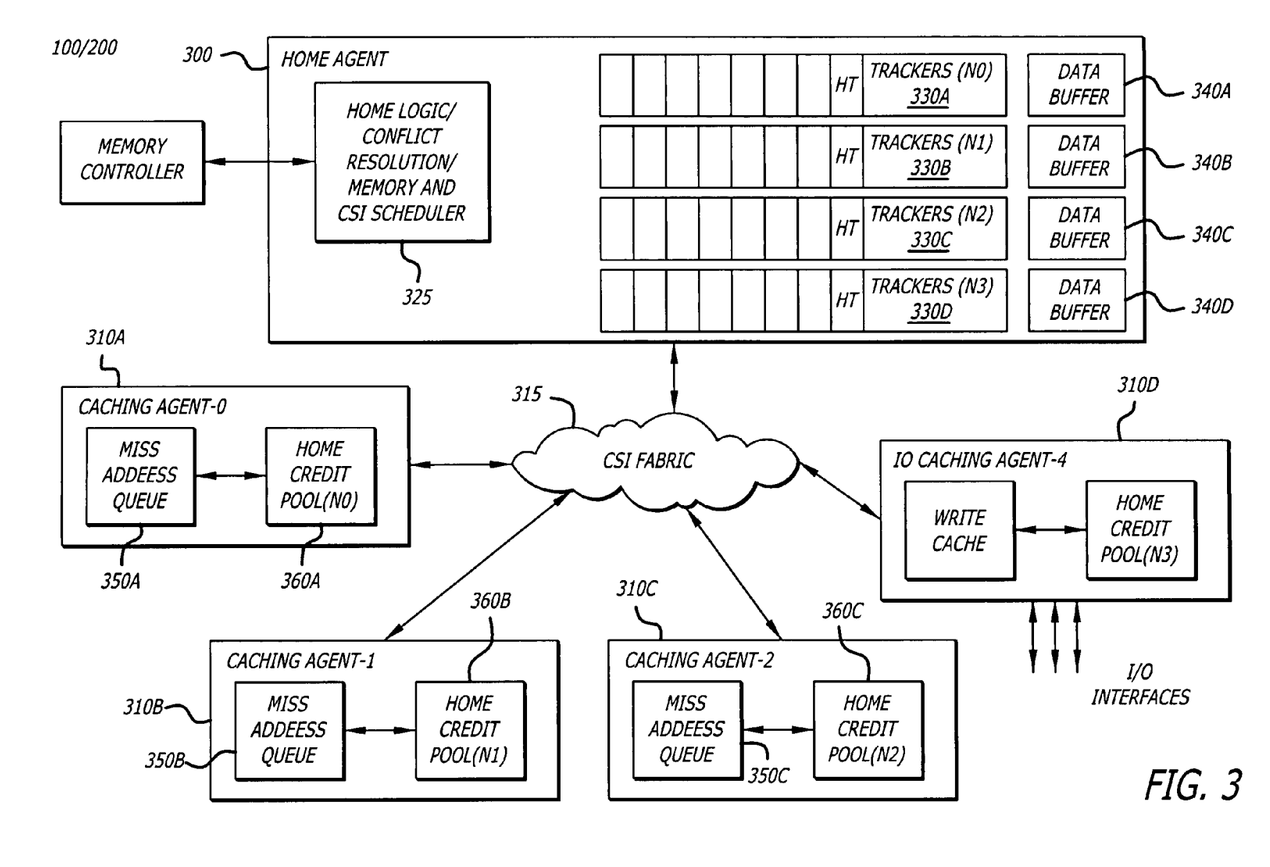
FIG. 3 is an exemplary embodiment of architectures for home and caching agents of the systems of FIGS. 1-2 in accordance with an embodiment of the invention.

Referring now to FIG. 3, an exemplary embodiment of architectures for destination and source devices of the systems of FIGS. 1-2 in accordance with an embodiment of the invention is shown. For illustrative purposes, processor 210D (or processor 150) is configured as a destination device 300, such as a home agent for example. Processors 210A-210C (or processor 110) could be configured as sources 310A-310C, such as caching agents for example. IOH 280 or 285 (or IOH 180 of FIG. 1) may be configured as I/O device 310D implementing a write cache 320 operates as a caching agent as well.

As described below, each source 310A, . . . , or 310D is associated with a tracker that is maintained at destination device 300 and has a predetermined number of tracker entries. The number of tracker entries is limited in size to the number of requests that may be transmitted by any source 310A, . . . , or 310D that saturates the bandwidth of a CSI fabric 315, which supports point-to-point communications between destination 300 and the plurality of sources (e.g., sources 310A-310D).

As shown in FIG. 3, according to this embodiment of the invention, destination 300 is a home agent that comprises home logic 325 and a plurality of trackers $330_1 \ldots 330_M$, where $M \geq 1$. In combination with trackers $330_1 \ldots 330_M$, home logic 325 is adapted to operate as a scheduler to assist in the data transfer of incoming information from memory 230A of FIG. 2 and outgoing information to CSI fabric 315. Moreover, home logic 325 operates to resolve conflicts between these data transfers.

Herein, for this embodiment of the invention, since four (4) caching agents 310A-310D are implemented within system 100/200, four (M=4) trackers are illustrated and labeled "HT-0" 330A, "HT-1" 330B, "HT-2" 330C and "HT-3" 330D. These trackers 330A-330D each contain N0, N1, N2 and N3 tracker entries respectively, where $Ni \geq 1$ (i=1,2,3 or 4). The number of entries (N0-N3) may differ from one tracker to another. Associated with each entry of trackers 330A-330D is a corresponding data buffer represented by data buffers 340A-340D. Data buffers 340A-340D provide temporary storage for data returned from memory controller 220A, and eventually scheduled onto CSI fabric 315 for transmission to a targeted destination. The activation and deactivation of the entries for trackers 330A-330D is controlled by home logic 325 described below.

Caching agents 310A, 310B, and 310C include a miss address queue 350A, 350B, and 350C, respectively. For instance, with respect to caching agent 310A, miss address queue 350A is configured to store all of the miss transactions that are handled by home agent 300.

In addition, according to this embodiment of the invention, caching agents 310A, 310B and 310C further include a credit counter 360A, 360B and 360C, respectively. Each credit counter 360A, 360B, and 360C maintains a count value representative of the number of unused tracker entries in trackers 330A, 330B, and 330C. For instance, when a new transaction is issued by caching agent 310A to home agent 300, credit counter 360A is decremented. If a transaction completes, then credit counter 360A is incremented. At reset time, credit counter 360A is initialized to the pool size equal to the number of tracker entries (N0) associated with tracker 330A. The same configuration is applicable to credit counters 360B-360C.

Also shown in FIG. 3 is an example of caching agent 310D operating as an I/O agent that reads information from memory and writes information to an I/O interface. Alternately, caching agent 310D may stream I/O agent read returns as writes into the main memory. Caching agent 310D implements write cache 320, which is used to sustain high bandwidth while storing data associated with I/O operations.

Similar to the caching agents 310A-310C, caching agent 310D comprises a credit counter 360D that maintains a count value representative of the number of unused tracker entries within tracker 330D. At reset, credit counter 360D is initialized to a pool size equal to the number of tracker entries (N3) associated with tracker 330D.

The number of tracker entries (N0, N1, etc.) has been designed to handle bursty traffic scenarios, and thus, has been sized for sustaining the peak bandwidth. In other words, potential burstiness and long latencies cause home agent 300 to allocate a pessimistic amount of resources for caching agents 310A-310D (requesting agents). As an example, from home agent 300 to caching agent 310A, in the event that the peak data bandwidth is $X_A$ gigabytes per second (GBps) and the latency of a transaction from the time it is issued from caching agent 310A to home agent 300 to the time the completion returns to caching agent 310A is $L_A$ nanoseconds (ns), the size (N0) of trackers is given by $(X_A * L_A)/64$, presuming each tracker entry is 64 bytes in size.

Typically, the latency from (I/O) caching agent 310D is almost 1.5× times that of the processor caching agents 310A-310C. This is because the pipeline for caching agent 310D starts closer to the I/O interface logic, and typically, I/O device clock speeds are 5 times slower than that of processors. Table 1 demonstrates potential latency, peak data bandwidth, and the number of tracker entries for a DP system.

TABLE 1

| Caching Agent | Latency (ns) | Peak BW (Gbps) | Tracker Entries |
|---|---|---|---|
| Local caching agent | 100 | 12.8 | 20 |
| Remote caching agent | 135 | 12.8 | 27 |
| IOH caching agent | 175 | 12.8 | 35 |

Typically, the number of tracker entries (Ni) is chosen as a multiple of 2, 4 or 8, and hence, the sizes selected for the trackers would be 20, 28 and 36, respectively. A large number of tracker entries and buffers can require a significant amount of power usage, so that such architecture is not optimal.

Secondly, in most operating conditions, the traffic throughout a system is quite bursty and does not stay at a peak bandwidth for long periods of time. Rarely, the full number of allocated tracker entries is used. Therefore, power usage can be optimized by modulating the number of active tracker entries based on activity, where caching agents (sources) are empowered to dynamically manage required resources at a home agent (destination) through use of a messaging scheme. This messaging scheme is referred to as source controlled dynamic power management (SCDPM) as described below.

II. SCDPM Architecture

Figure 4:
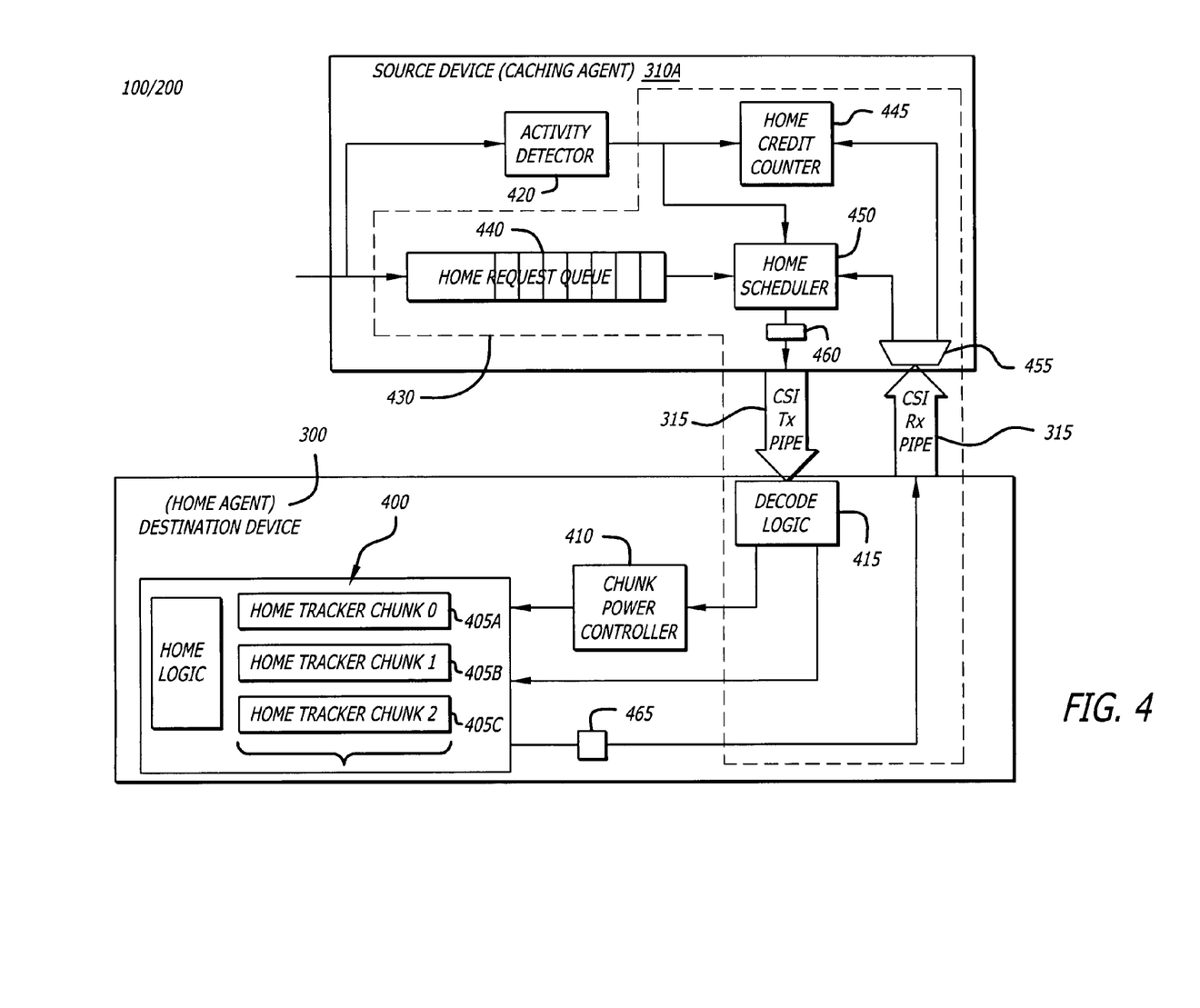
FIG. 4 is a first exemplary embodiment of an architecture of source controlled dynamic power management (SCDPM) employed within systems of FIGS. 1-2 in accordance with an embodiment of the invention.

As shown in FIG. 4, a first exemplary embodiment of an architecture of source controlled dynamic power management (SCDPM) employed within systems 100/200 is shown. Herein, according to this embodiment of the invention, SCDPM includes power control logic that controls a partitionable resource 400 located at a home agent (destination) 300. The power control logic may include, but is not limited or restricted to (i) a power controller 410, (ii) an activity detector 420, and (iii) a messaging mechanism and decode logic 430. For this illustrative embodiment, for clarity purposes, SCDPM between home agent 300 and caching agent 310A is shown, although it is contemplated that the SCDPM logic may be deployed exclusively within a single device including both a home agent and a caching agent.

In general, resource 400 is partitioned into "chunks," namely temporary storage of equal size. For instance, at home agent 300, trackers 330A-330D would constitute resource 400, and entries within trackers 330A-330D are partitioned into a selected number of chunks. Each "chunk" would have a predetermined number of tracker entries. As an example, each "chunk" may be configured to be a predetermined multiple of tracker entries in size (e.g., eight tracker entries in size), but of course, other sizes may be chosen to optimize power efficiency. As a result, three chunks 405A-405C would be allocated for a first of tracker 330A as shown. Each source (caching agent) can be configured to know the size of the chunk apriori prior to initiating the control mechanism.

Chunk power controller 410 can turn on/off a certain number of chunks based on the decoded incoming control messages. As an example, this dynamic power control may be accomplished by turning on/off clocks (thus saving dynamic and clocking power), making the chunks power neutral (saving leakage as well), and the like.

An activity detector 420 located within caching agent 310A determines the amount of destination resources, namely the number of entries (or number of chunks if different granularity is desired), needed over a reasonable period of time. Hence, activity detector 420 operates to minimize the number of entries, but takes into account slight deviations in need so as to minimize the effect on overall performance.

According to one embodiment of the invention, message mechanism and decode logic 430 can transfer and interpret resource control messages from the source and deliver them to appropriate destination resources. More specifically, message mechanism and decode logic 430 comprises power control logic located at the caching agent (source) and/or home agent (destination).

With respect to power control logic located at the caching agent, such logic comprises a home request queue 440, a home credit counter 445, a home scheduler 450, and signal separation logic 455. Home credit counter 445 keeps track of the number of free entries within a tracker assigned to the source. This is accomplished by a messaging scheme involving control messages 460 and 465 exchanged over CSI fabric 315 between caching agent 310A and home agent 300.

Home request queue 440 includes all transactions that are waiting to be issued to home agent 300 for memory access (Read "RD", Write "WR", Invalidate "INVL", etc). Activity detector 420 watches the overall activity in home request queue 440, and based on this information and perhaps other events such as activity of the miss address queue (increased queuing translates to more requests by the core and increased tracker number) or power state of the core (low-power state translates to reduced activity and decreased tracker number), determines the number of tracker entries (or chunks) needed at any time.

For instance, when transactions are pending in request queue 440, home scheduler 450 will check whether there are credits available for home agent 300 to process a pending transaction, where each credit corresponds to an unused entry of tracker 330A. If so, home scheduler 450 will issue a request to CSI fabric 315. After the request is issued, credit counter 445 is decremented since the number of free entries within tracker 330A has been decremented by one. After the transaction has been completed, credit counter 445 is incremented by one based on a request from destination device (home agent) 300 to increment credit counter 445.

Moreover, at certain times, activity detector 420 will signal home scheduler 450 to issue a power control message 460 to CSI fabric 315 in accordance with a messaging scheme between the source and destination. Power control message 460 is a message that is interpreted by power controller 410 to turn on/off one or more chunks within tracker 330A. More specifically, upon receipt and decode of power control message 460 by decoding logic 415, which may include a demultiplexer to separate control messages from incoming data as shown, power controller 410 is signaled to turn on/of certain chunk(s).

Thereafter, after the chunk(s) are turned on/off, home agent 300 transmits a power control complete message 465 to caching agent 310A. The contents of power control complete message 465 are extracted by signal separation logic 455 and supplied to home scheduler 450 as notification of the change in the number of active chunks within tracker 330A. In addition, credit counter 445 is reset to a new number of credits corresponding to the number of active tracker entries and is used by home scheduler to monitor proper flow of new transactions to home agent 300.

It is contemplated that the transmission of control message 460 may be configured so that the message arrives at predetermined time intervals, and hence, home agent 300 would not need to continuously monitor for such messages. Also, it is further contemplated that multiple home agents may service each caching agent, and therefore, power control for each home agent has been configured to be completely independent from power controls of another home agent. It is contemplated, however, that further power savings may be realized by coordinating power controls between various home agents.

In summary, message mechanism and decode logic 430 uses a mailbox style scheme, where the mailbox is a control and status register (CSR) write to a predetermined CSR space within home agent 300. The write can be accomplished using a NcCfgWr (Configuration Write) message type that includes a source identifier (ID), an ID of the destination resource (destination ID) and information to discern the number of chunks requested to be active (credits). This information would be loaded into decoding logic 415 that includes a Command (SCDPM CMD) CSR register (not shown). This register may be accessed to obtain a unique identification for the source device and destination device, and the number of credits.

Figure 5:
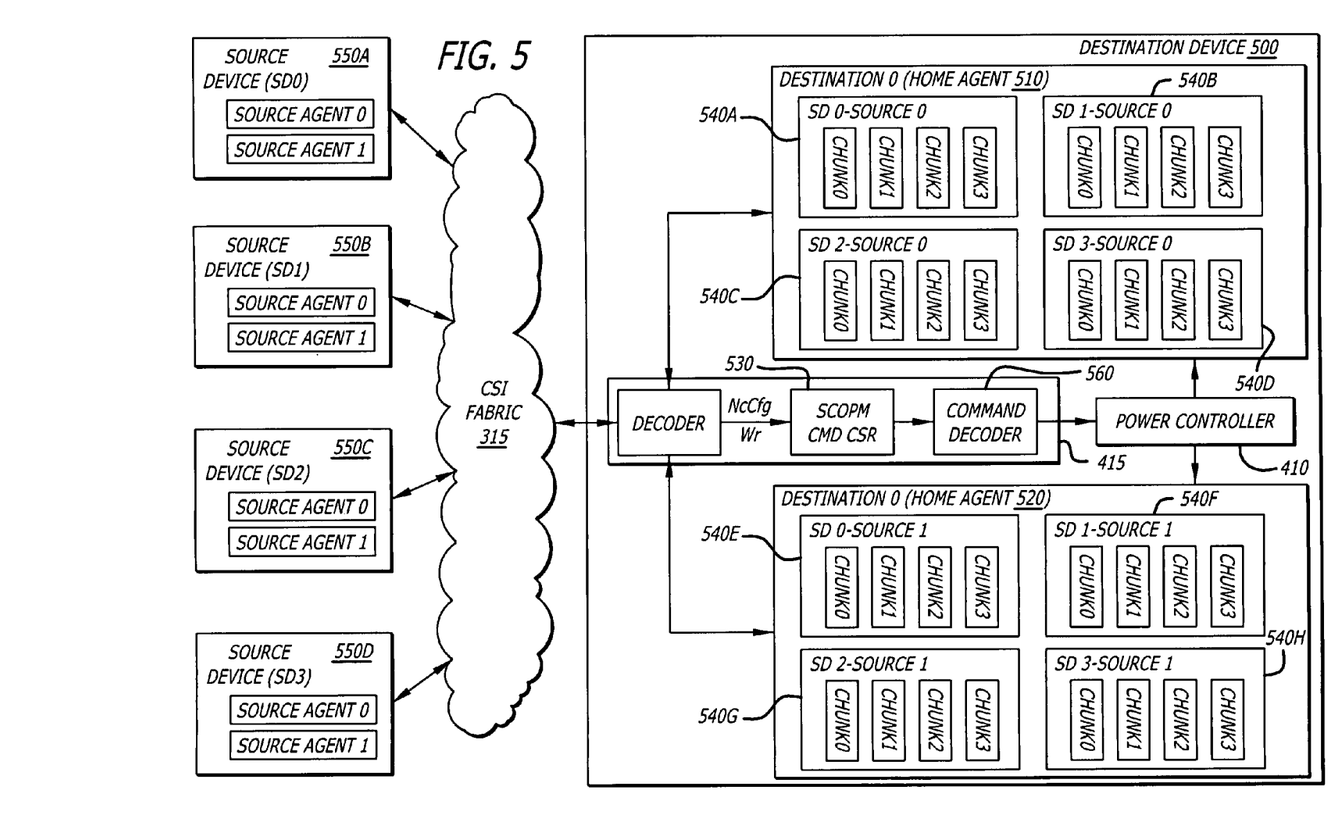
FIG. 5 is a second exemplary embodiment of the SCDPM architecture for the home agent of FIG. 2 in accordance with an embodiment of the invention.

Referring now to FIG. 5, a second exemplary embodiment of the SCDPM architecture supporting multiple destinations (e.g., home agents 510 and 520) within a single destination device 500 is shown. Herein, each destination device 500 includes a SCDPM CMD CSR register 530 being part of decoding logic 415 of FIG. 4, which is used to control the resources for any given logic in destination device 500. Resource logic 540A-540D of a first home agent (destination0) 510 and resource logic 540E-540H of second home agent (destinations) 520 are addressed by a unique ID, which is predetermined at initialization. The format of SCDPM CMD CSR register 530 is shown in Table 2.

TABLE 2

| Field Name | Bits | Comments |
| --- | --- | --- |
| SID | 0-3 | Source logic ID |
| DID | 4-7 | Destination logic ID |
| Active bit Vector | 8-63 | A bit vector indicating which chunks are requested to be active |

For each configuration change, a source node identifier (SNID) associated with a particular source agent (e.g., caching agents included in source devices 550A-550D) is combined with information (source ID "SID") within the SID field in SCDPM CMD CSR register 530. This combination, namely a concatenation, bitwise or byte wise logical operation or the like, provides a unique identification of the source device. Similarly, an identifier for destinations (home agents) 510 and 520, referred to as the "destination node ID" or "DNID," is combined with information within the DID field in SCDPM CMD CSR register 530. This combination provides a unique identification for home agents 510 and 520 upon decoding by command decoder 560 and performed by power controller 410.

This generic message passing architecture allows logic within any source to address logic in any destination having scalable, partitionable resources.

III. Power Control Operations

Figure 6:
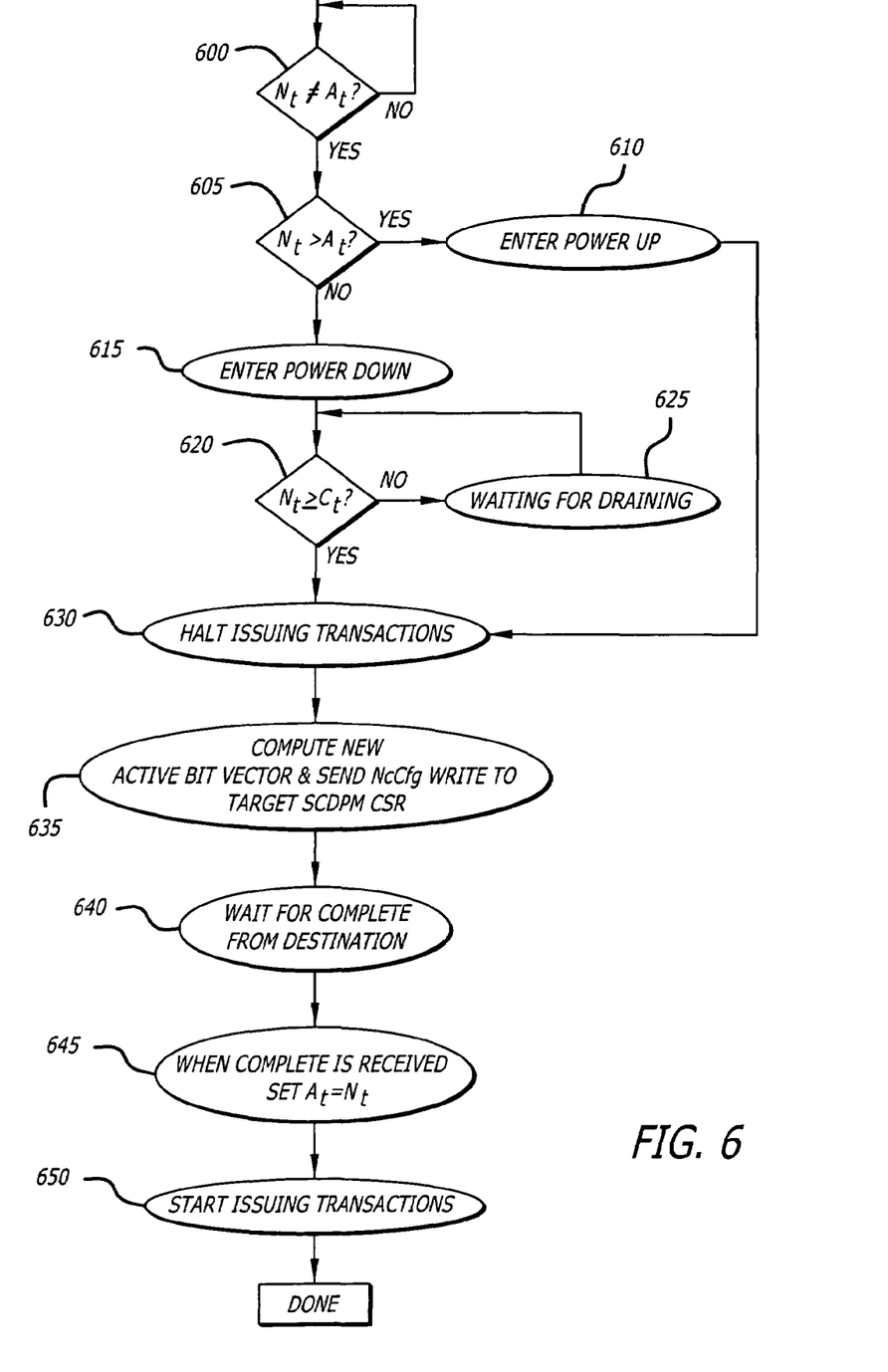
FIG. 6 is an exemplary embodiment of a core driven activity detector for a caching agent deployed within the system of FIG. 2.

The power control operations are performed independently for each source-destination pair, namely for each SNID:SID and DNID:DID pair. Referring first to FIG. 6, an exemplary embodiment of the operations performed by logic within the source device is shown.

At each source (SNID:SID), for each DNID:DID, there is an activity detector. The activity detector can decide asynchronously on the number of trackers it requires. For clarity purposes, the term "$N_t$" denotes the number of tracker entries deemed required by activity detector at time t. In addition, the term "$A_t$" denotes the maximum number of active entries within a tracker, namely the maximum number of credits available at time t. The term "$C_t$" denotes the number of entries used at time t (e.g., number of outstanding transactions). Thus, upon issuing a new transmission, $C_t$ is incremented by 1, and upon receiving a completion message associated with a completed transaction, $C_t$ is decremented by 1.

More specifically, if $N_t$ is not equal to $A_t$, there may be a need to perform a power control operation (block 600). Of course, it is contemplated that a determination can be made whether $N_t$ is greater than a percentage percentage of $A_t$ to avoid power control throttling.

A first determination is whether $N_t$ is greater than $A_t$ (block 605). If so, power control logic begins a power-up operation to activate more storage at the destination (block 610). Otherwise, power control logic begins a power-down operation (block 615). If the number of outstanding transactions is greater than the number of tracker entries required after power-down, the power-down operation needs to wait until the number of outstanding transactions is less than or equal to $C_t$ (blocks 620 and 625). Thereafter, the power adjustment operations are performed.

During the power adjustment operations, the source halts issuing transactions (block 630) and computes a new active bit vector that indicates the number of active chunks desire. Thereafter, a Non-coherent, Configuration (NcCfg) CSI write signal is sent to targeted SCDPM CSR register (block 635). The NcCfg signal is a CSI sensing operation that requires all transaction issued before this signal to be completed and prohibits any subsequent transactions from completing until the transaction associated with the NcCfg write is completed.

Thereafter, once the complete message associated with the NcCfg write operation is complete, which indicates that the operations initiated by the NcCfg write that have been completed, the number of credits $A_t$, corresponding to the maximum number of tracker entries, is set to $N_t$ (blocks 640 and 645). Thereafter, the source starts issuing transactions (block 650).

Figure 7:
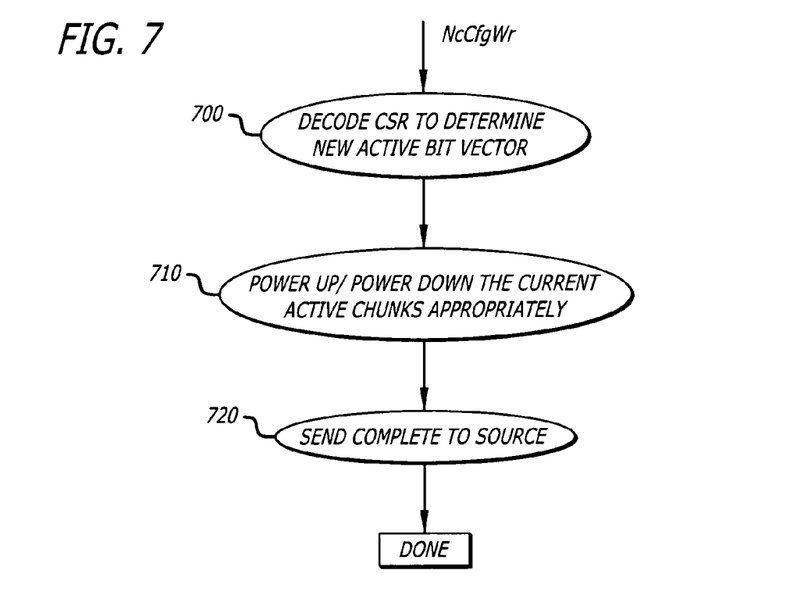
FIG. 7 is an exemplary embodiment of an input/output hub (IOH) activity detector for a caching agent deployed within the system of FIG. 2.

Referring now to FIG. 7, an exemplary embodiment of the operations performed by logic within the destination device is shown. At each destination (e.g., home agent), there is a power controller that decodes the NcCfg write message and recovers the active bit vector transmitted from the source device (block 700). Thereafter, the power controller performs power-up or power-down operations to the chunks identified by the active bit vector (block 710). Thereafter, a power control complete message is returned to the source device to identify that the requested power control sequence has been completed (block 720).

According to one embodiment of the invention, the destination control logic does not have to check for any races since the source ensures that the message arrives at valid power-down and power-up boundaries.

IV. Detectors

A. Core Driven Activity Detector

Figure 8:
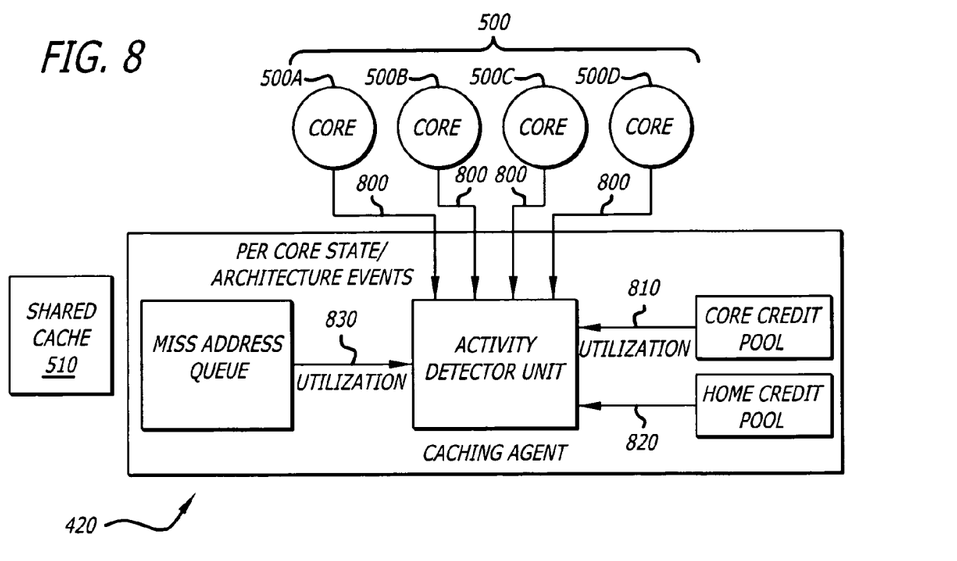
FIG. 8 is an exemplary flowchart of the operations of a source device.

Referring now to FIG. 8, a first embodiment of activity detector 420 of FIG. 4 is shown. Herein, activity detector 420, referred to as a "core driven activity detector," is logic residing in the source (e.g., caching agent 310A) and is coupled to one or more cores 500 (e.g., cores 500A-500D) and a shared cache 510. Core driven activity detector 420 can screen through traffic generated from the core(s) 500 and generate a message to its destination for proper power tuning.

Detecting and predicting core behaviors in the subsequent period of time is challenging because core behaviors are application specific, and thus, are difficult to cover all cases of operation. Core driven activity detector 420 may be adapted to look at various inputs to determine appropriate actions. Some of these inputs are set for below, albeit other inputs may be used.

Architecture Event counts 800 can sometimes be very useful of predicting burstiness behavior. For example, a core experiencing a large number of branch mispredictions or page misses provides a good indication for upcoming streams of memory requests. Also, other architecture events can be captured and provide insight to activity detector 420 for burstiness behavior.

For instance, core credit consumption and its request queue utilization 810 can be a very good tool for understanding current core behavior. If a core issues a minimum number of requests to the caching agent, this fact identifies that the core is executing efficiently. On the other hand, a core that is using up all its core credit may indicate that more chunks need to be powered to sustain the core requests.

Home credit counts 820 indicate how many tracker entries are currently consumed by a caching agent. While this may not be a good indication to predict further usage of tracker entries, it provides a good indication that a power down operation of tracker entries at the home agent is needed, especially if the credit count is consistently high and exceeds a set credit threshold for a prolonged period of time.

Similar to the home credit pool, miss address queue utilization 830 is another indication whether the core is experiencing lots of cache miss and is requesting memory request to the home agent. Both home credit pool 820 and miss address queue utilization 830 can be used as threshold mechanisms to determine proper power state of the home agents.

A collection of per core power state can be very useful information for the activity detector. Core(s) in lower power state or shutdown state generate low or zero number of requests to the caching agent. By knowing power states per core, we can quickly determine or even predict the usage ability of home tracker entries. For example, a core that has been selected in turbo mode is a good indication of more requests coming from this particular core. While a core just entered shutdown state indicate that the core will not generate any new requests anytime soon. Furthermore, if all cores have entered shutdown state, it is recognized that a message can be sent to power down and reduce the number of active chunks associated with the tracker for this caching agent.

B. IOH Activity Detector

Figure 9:
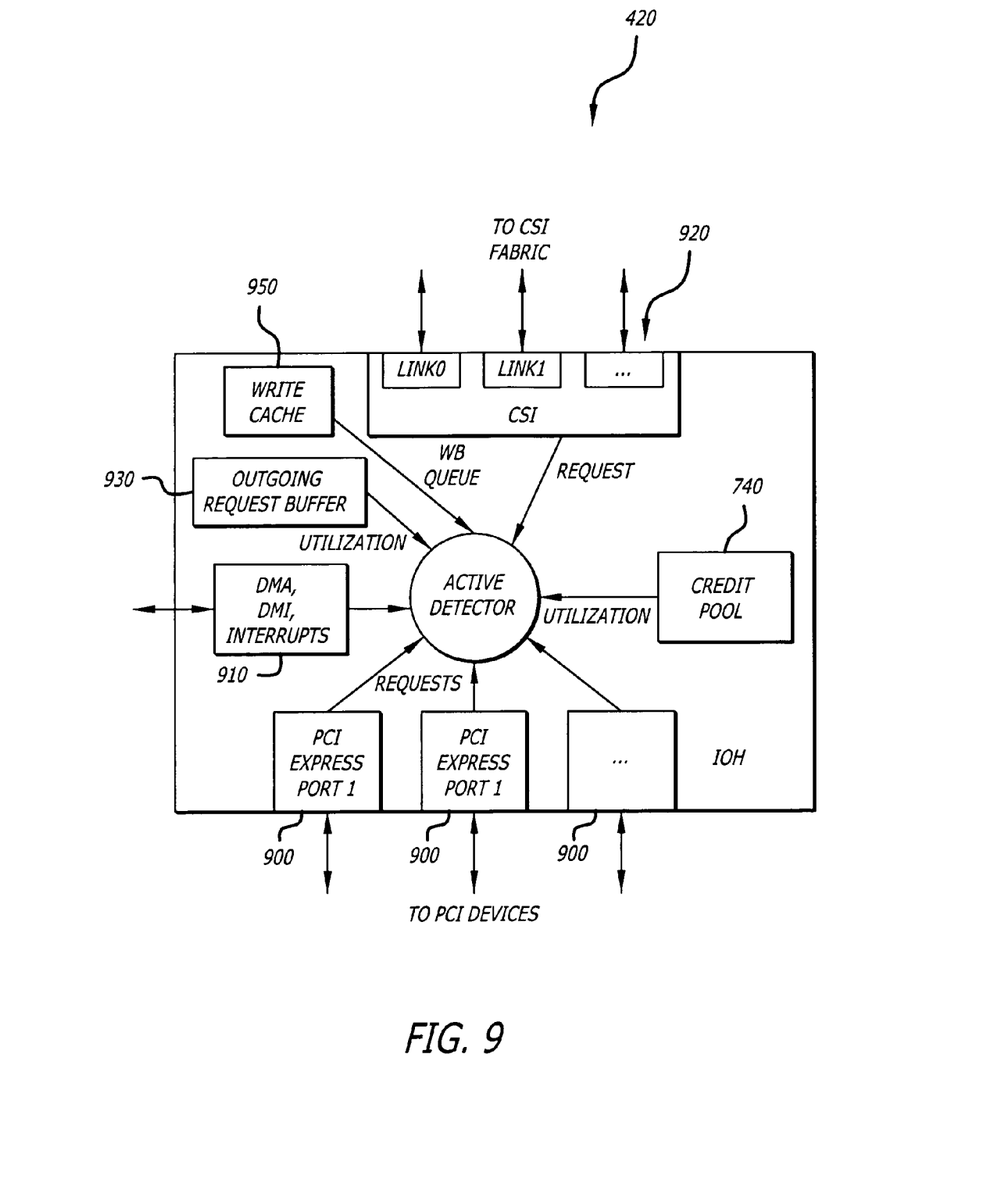
FIG. 9 is an exemplary flowchart of the operations of a destination device.

Referring now to FIG. 9, a second embodiment of activity detector 420 of FIG. 4 is shown. Herein, activity detector 420, referred to as an "IOH activity detector," is responsible for determining the power management commands it needs to send to its connected clients (destinations). To make this determination, IOH activity detector 420 uses resources within the IOH architecture. These resources include, but are not limited or restricted to those resources set forth below.

PCI Requests/Events: IOH activity detector 420 can screen the request/event commands that come from PCI ports 900. Based on these commands, IOH activity detector 420 can scan for power-usage hints by noting the request/event type and the destination ID.

DMA/DMI/Interrupt Requests/Events: Similar to the PCI, the DMA and DMI (for legacy-bridge) and Interrupts 910 can also yield hints for client power management.

CSI Requests/Events and Power States: As the IOH receive requests and events 920 from the CSI busses, IOH activity detector 420 implemented within the IOH can utilize such information. Of interest are power states for CSI where the CSI can switch to low power modes which may indicate a particular client can have tracker resources powered-down.

Outgoing Request Buffer: Outgoing Request Buffer 930 is internal logic of the IOH and tracks all transactions issued on the CSI bus. This is especially useful for early data stream detection where a client is about to write/read a large of data to an I/O device.

Credit Pool: Credit pool 940 provides an indication of the current credit usage by the destinations, and thus, information from credit pool 940 provides a snapshot of the current usage requirements. If this information indicates to the IOH activity detector 420 that the client is severely under-powered, an emergency control power-up message can be issued.

Write Cache: Write-cache 950 contains data written from the I/O devices waiting to go to the main-memory of a client(s). During write-back (WB), requests are queued up to send the data to the client(s). By monitoring this queue, the traffic that will be caused by the pending write-backs can be estimated. Depending on the size and write-back rate of the queue will affect how far ahead IOH activity detector 420 can estimate regarding future usage.

In contrast to the core activity detector of FIG. 8, the IOH activity detector tends to have more time and better indicators for future client resource usage. This is largely due to the higher-latency characteristics of the I/O devices which allows more time from when requests are made to when data actually appears, the large amount of concurrent streaming data (such as DMA), and the lack of an all purpose cache. Although we have many resources available to IOH activity detector 420, the design of IOH activity detector 420 should address one or more of the following:

(1) IOH activity detector 420 operates so that the usage approximation is "time" accurate enough so as to minimize resource contention. For example, if the IOH is getting ready to write a stream of data to a home agent, the detector needs time to detect the request, make a decision, and send the power-up command to the home agent in time for the home agent to adjust.

(2) IOH activity detector 420 operates so that the "size" of the tracker resources is accurate enough so as to minimize resource contention. For example, IOH activity detector 420 should notice when a home agent is receiving infrequent data and adjusts the tracker to a sufficient size to handle the request and also save power.

(3) IOH activity detector 420 operates with enough power-management granularity to find an optimal power usage configuration for the home agent. For example, a simple ALL ON or ALL OFF granularity may not be enough in most situations and can cause instability.

(4) IOH activity detector 420 operates so as to minimize throttling frequency (that is, the rate at which IOH activity detector 420 sends power management messages to the home agent(s)). This will avoid flooding a home agent with power-management messages which use CSI bandwidth and may cause latency increases in performing power adjustments.

(5) IOH activity detector 420 makes decisions based on multiple criteria based on past, current, and future knowledge. Once activity detector 420 decides it can (or, in some cases, needs to) send a power-management request message to a home agent, it constructs the message and sends that message to the destination.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:

1. A method comprising:
   determining by a source device whether to initiate a power-up operation in order activate one or more additional chunks within memory of a destination device, each chunk including a plurality of tracker entries and each tracker entry of the plurality of tracker entries being a selected number of bytes in size and used for storage of a memory request;
   transmitting information that identifies a number of active chunks needed from the source device to the destination device; and
   determining by the source device whether to initiate a power-down operation in order deactivate one or more chunks within memory of the destination device and conserve power.

2. The method of claim 1, wherein the source device is a caching agent and the destination device is a home agent.

3. The method of claim 1, wherein the information is an active bit vector.

4. The method of claim 3 further comprising halting issuance of transactions by the source device prior to transmitting the active bit vector.

5. The method of claim 1 further comprising:
   temporarily waiting to initiate the power-down operation if a number of outstanding transactions is greater than a number of tracker entries active after the power-down operation.

6. An apparatus comprising:
   an activity detector;
   a resource partitioned into a first plurality of chunks including a second plurality of chunks assigned to an agent, each chunk including a plurality of tracker entries and each tracker entry being a selected number of bytes in size and used for storage of a memory request; and
   a power controller in communication with the activity detector and the resource, the power controller, based on measured activity by the activity detector, to (i) activate an additional chunk of the first plurality of chunks and assigned the additional chunk to the agent if the measured activity indicates that an increase in memory requests and (ii) deactivate at least one chunk of the second plurality of chunks to conserve power.

7. The apparatus of claim 6, wherein the power controller is adapted to activate or deactivate chunks of the resource based on decoded incoming control messages.

8. The apparatus of claim 7, wherein the activity detector monitors activity of a request queue to determine an optimal number of tracker entries allocated for use by the agent.

9. The apparatus of claim 8, wherein the activity detector monitors activity of a miss address queue to determine the optimal number of tracker entries for use by the agent.

10. The apparatus of claim 8, wherein the activity detector monitors activity of a power state of a core to determine the optimal number of tracker entries for use by the agent.

11. The apparatus of claim 6 further comprising a credit counter to keep track of a number of free entries within a tracker assigned to the agent.

12. The apparatus of claim 6 further comprising a home scheduler that, in response to signaling by the activity detector, issues power control messages to the power controller to control activation and deactivation of the first plurality of chunks.

13. An apparatus comprising:
   a resource partitioned into a first plurality of chunks assigned to an agent, each chunk including a plurality of tracker entries and each tracker entry being used for storage of a memory request; and
   a power controller in communication with the resource, the power controller, based on a received, incoming control message, to (i) activate an additional chunk of the first plurality of chunks and assign the additional chunk to the agent if the control message indicate that an increase in memory requests is occurring and (ii) deactivate at least one chunk of the first plurality of chunks if the control message indicates that a decrease in memory requests is occurring so that a lesser number of activated tracker entries is needed.

14. The apparatus of claim 13, wherein the power controller is adapted to activate or deactivate chunks of the resource after decoding of the incoming control message.

15. The apparatus of claim 13 further comprising an activity detector that monitors activity of a request queue to determine an optimal number of tracker entries allocated for use by the agent.

16. The apparatus of claim 15 further comprising a home scheduler that, in response to signaling by the activity detector, issues the control messages to the power controller to control activation and deactivation of the first plurality of chunks.

17. The apparatus of claim 13 further comprising an activity detector that monitors activity of a miss address queue to determine the optimal number of tracker entries for use by the agent.

18. The apparatus of claim 13 further comprising an activity detector that monitors activity of a power state of a core to determine the optimal number of tracker entries for use by the agent.

19. The apparatus of claim 13 further comprising a credit counter to keep track of a number of free entries within a tracker assigned to the agent.

* * * * *